K. E. BLUM.
BEDPAN.
APPLICATION FILED JULY 29, 1920.

1,361,746.

Patented Dec. 7, 1920.

WITNESSES

INVENTOR
K. E. BLUM
BY
ATTORNEYS

UNITED STATES PATENT OFFICE.

KATHARINE E. BLUM, OF NEW YORK, N. Y.

BEDPAN.

1,361,746.

Specification of Letters Patent.

Patented Dec. 7, 1920.

Application filed July 29, 1920. Serial No. 399,774.

*To all whom it may concern:*

Be it known that I, KATHARINE E. BLUM, a citizen of the United States, and a resident of the city of New York, borough of Manhattan, in the county and State of New York, have invented a new and Improved Bedpan, of which the following is a full, clear, and exact description.

The present invention relates to new and useful improvements in hospital appliances, and it pertains more particularly to devices of this character commonly known as bed pans.

It is one of the primary objects of the invention to produce a device of this character which is capable of being readily taken apart in order that the same may be properly cleaned and kept in a sanitary condition.

It is a further object of the invention to so construct a device of this character as to facilitate its use.

It is a still further object of the invention to provide a bed pan with a drain in order that the contents of the pan may be readily carried off, thus reducing to a minimum the possibility of their being spilled.

With the above and other objects in view, reference is had to the accompanying drawings, in which—

Figure 1:
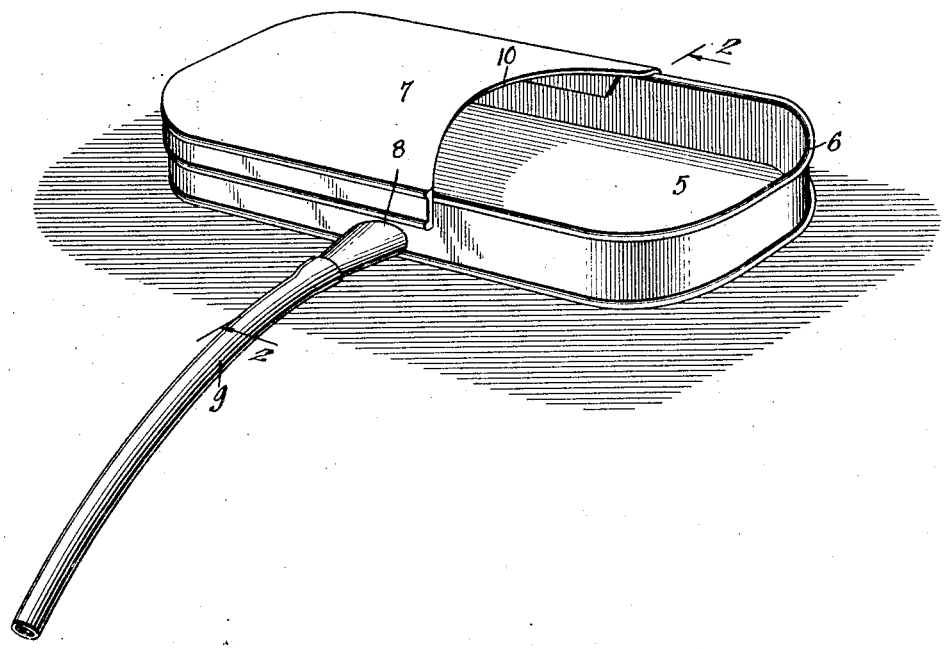
Figure 1 is a perspective view of a device constructed in accordance with the present invention.
Figure 2:
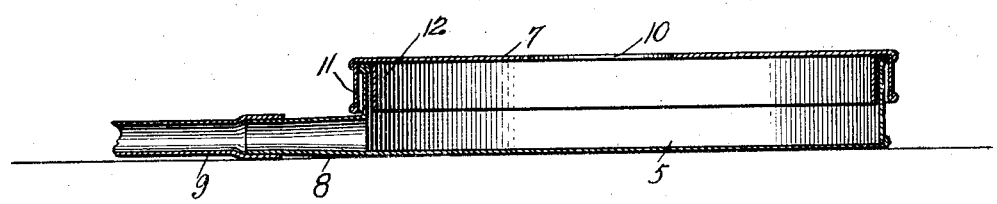
Fig. 2 is a longitudinal sectional view thereof with a portion of the drain broken away.

Referring more particularly to the drawings, the device comprises a receptacle 5, the shape of which is preferably rectangular with rounded corners 6. This receptacle 5 is preferably built shallow and is provided with a removable cover 7. Leading from the receptacle and preferably from one of the side walls thereof, is a spout 8. The spout 8 is rigid and has detachably secured thereto a flexible tube 9, preferably of rubber, which tube serves as a drain for the receptacle 5.

As more clearly shown in Fig. 1, the cover 7 has one of its ends cut out as indicated at 10 in order to provide an open space at the top of the receptacle. The cover 7 is provided with a depending flange 11 adapted to inclose a portion of the upper edge of the receptacle 5, and secured to the cover 7 in spaced relation to the depending flange 11 and extending parallel therewith, is an internal flange 12. This internal flange 12 depends from the cover and is adapted to position itself within the receptacle 5 when the cover is placed thereon. By means of the internal flange 12, it will be apparent that the contents of the receptacle 5 will be prevented from passing between the cover 7 and the upper edge of the said receptacle thereby reducing to a minimum the possibility of the contents of the receptacle being spilled.

By constructing the receptacle 5 and the cover 7 as above described, it will be apparent that the cover is reversible with respect to the receptacle, thereby adapting the device for use on either side of the bed.

Claim:

A bed pan comprising an open receptacle having means for draining the same, a bead defining the open edge of said receptacle, a reversible cover for said receptacle, said cover having an open curved end, a pair of parallel flanges depending from said cover in spaced relation to each other, said flanges conforming in curvature to the curvature of the ends of the receptacle whereby said flanges are adapted to form a liquid tight joint between the cover and the receptacle in either position of the cover.

KATHARINE E. BLUM.